United States Patent [19]

Cok

[11] Patent Number: 5,548,692
[45] Date of Patent: Aug. 20, 1996

[54] METHOD FOR LAYOUT OF ARBITRARILY SIZED AND SHAPED ICONS IN A DISPLAY

[75] Inventor: Ronald S. Cok, Rochester, N.Y.

[73] Assignee: Eastman Kodak Company, Rochester, N.Y.

[21] Appl. No.: 391,736

[22] Filed: Feb. 21, 1995

[51] Int. Cl.⁶ .................................................. G06T 3/00
[52] U.S. Cl. ........................ 395/133; 395/139; 395/155; 395/159
[58] Field of Search ................................... 395/133, 135, 395/138, 139, 141, 155, 158, 159, 161, 118, 119

[56] References Cited

U.S. PATENT DOCUMENTS

| | | |
|---|---|---|
| 4,831,556 | 5/1989 | Oono ........................................ 364/521 |
| 5,001,697 | 3/1991 | Torres ....................................... 364/521 |
| 5,021,976 | 6/1991 | Wexelblat et al. ........................ 364/521 |
| 5,062,060 | 10/1991 | Kolnick ..................................... 364/521 |
| 5,140,677 | 8/1992 | Fleming et al. ........................... 395/159 |
| 5,140,678 | 8/1992 | Torres ....................................... 395/159 |
| 5,179,655 | 1/1993 | Noguchi et al. .......................... 395/158 |
| 5,226,109 | 7/1993 | Dawson et al. ........................... 395/120 |
| 5,227,771 | 7/1993 | Kerr et al. ................................. 340/731 |
| 5,237,647 | 8/1993 | Roberts et al. ........................... 395/119 |
| 5,237,653 | 8/1993 | Noguchi et al. .......................... 395/158 |
| 5,249,296 | 9/1993 | Tanaka ...................................... 395/700 |
| 5,257,349 | 10/1993 | Alexander ................................. 395/159 |

*Primary Examiner*—Almis R. Jankus
*Attorney, Agent, or Firm*—Raymond L. Owens

[57] ABSTRACT

An automated method for calculating the positions of arbitrarily sized and shaped icons in a display area is disclosed.

3 Claims, 2 Drawing Sheets

METHOD FOR LAYOUT OF ARBITRARILY SIZED AND SHAPED ICONS IN A DISPLAY

FIELD OF THE INVENTION

The present invention relates to methods for computing the positions of icons in an ordered set in a display area such as the display of a computer and placing such icons in the display.

BACKGROUND OF THE INVENTION

Computer-based graphical user interfaces that facilitate the interaction of humans with computers have become commonplace. These interfaces often represent objects such as files or application programs with icons. Icons are small images or symbols that represent an object and that generally evoke the function or type of the object. The interfaces are displayed on computer controlled display devices such as cathode ray tubes (CRTs) or liquid crystal display (LCD) screens. The icons are manipulated by using pointing devices attached to the computer. The pointing device controls a small pointing icon on the graphical user interface (GUI) which can be overlaid on other object icons. By overlaying the pointing device icon on a particular object icon and performing some other action (such as button or key pressing), a computer can be instructed to perform an operation, generally on or with the object overlaid.

Graphical user interfaces (GUI) have been commonplace for many years and are available on most major computer products. One problem with the use of such interfaces is that the area available on the computer-controlled display device (computer screen) is limited and thus the interaction by the user with the computer can become constrained or inefficient. The user might not be able to display and interact with as many objects as he or she might wish or may become confused by the cluttered appearance of the screen. It is thus important, when using a GUI, to make optimal use of the space available on a computer screen.

Icons representing an object within a GUI are generally symbolic, pictorial rectangles of a common size. This facilitates the effective use of space and user recognition of the objects represented. To further optimize interaction with icons, users can often move the icons in a screen (or a segmented display area within a screen) to clarify the layout of the screen for the tasks at hand. Automated methods by which the computer lays out the icons are also available and are used to "clean up" the screen or display area.

When icons represent image objects within a GUI, it is helpful to use a very small version of the image itself as an icon rather than a standardized image of a symbol. These small image representations are also known as thumbnail images. The thumbnail image clearly represents the image content since it is simply a miniature version of the image. However, images are not consistent in size. Although some standards for image sizes and aspect ratios do exist, there is still a wide variety of image types, sizes and so on. Thus, the thumbnail representation of an image is apt to vary in both size (within limits) and aspect ratio. It is important, then, that a GUI which manipulates image objects represented by thumbnail icons be able to effectively deal with variably sized icons. This is clearly a problem as well for any other type of object that is represented by icons of different sizes and aspect ratios and, especially, for objects which may not be fundamentally rectangular or are irregular in shape.

SUMMARY OF THE INVENTION

It is the object of this invention to provide a method for the layout of icons on a computer screen display area which will optimize the use of the available area, provide an explicitly ordered or a partially ordered icon layout, require only sequential layout for explicit order, support arbitrary icon sizes and shapes, and which is computationally simple.

This object is achieved by an automated method for calculating the positions of arbitrarily sized and shaped icons in a display area, comprising the steps of:

(a) calculating a rectangular grid spacing based upon a preferred common size and spacing;

(b) selecting an icon from an ordered group of icons to be displayed;

(c) determining how many grids the icon requires for a rectangle which encompasses the icon using the minimum number of grids;

(d) locating the icon in an empty position following the last placed icon on the grid based on a predetermined ordered representation, which representation is linear and sequential in both the horizontal and vertical directions;

(e) testing to determine if the icon placement is possible in the located empty position and placing the icon if correct; if not correct, testing another empty position on the grid in accordance with the predetermined order by repeating steps (d)–(e); and (f) placing the icon in correctly determined empty positions.

A feature of this invention is that the calculations are simple and no restrictions are placed on the size or shape of the iconic object representation.

It can also be important with this invention that the icons displayed be ordered rather than simply positioned so that when users move the icons from place to place in the display the icons are not only relocated but their organization restructured. Although order is irrelevant for most operating system icon displays, there are particular applications for which order is essential. This order must be apparent to the user in a simple and clear way, so that the order can be readily understood and changed.

A still further feature is that the invention permits compactness of the laid out display.

Another important feature of ordered icon displays (especially when there are many icons) is layout sequentiality. If there are ten icons displayed and the sixth icon is moved to the eighth position, only the positions of icons six through ten should be modified; the first five should remain untouched. When icons are laid out, the position of a new icon can be calculated without reconsidering the positions of the icons already placed. The icon's positions are calculated sequentially beginning with the first icon whose order is modified. This feature reduces the computational requirements for laying out icons—an important consideration for interactive graphic interfaces.

The task of calculating the position of icons within a display area when cleaning up the display area is straightforward when adequate display area is available and when icons are consistent in size. However, when icons can vary in size and when the display area is minimal, laying out the icons is a much more difficult task.

The present invention can be used advantageously in the design of graphical user interfaces that implement iconic object representation.

The above and other objects of the present invention will become more apparent when taken in conjunction with the following description and drawings wherein like characters indicate like parts and which drawings form a part of the present invention.

DETAILED DESCRIPTION OF THE INVENTION

This invention concerns an automated method for calculating the positions of icons in an ordered set of icons with arbitrary shapes and sizes within a display area. When placed, the icons are in a perceptible order. The method optimizes the size of the display area consumed while minimizing the computational requirements. The method requires knowledge of the size of the display area, the sizes and shapes of the icons, and knowledge of what represents order within the layout.

This invention provides an automated method for displaying icons in a restricted display area. The icons can be of any size or shape, either regular, irregular, curved or rectangular. The computation requirements are very small, and the result is a completely ordered display which efficiently uses the available display area. When laying out a reordered list, the method does not require any redundant computation; object icons whose position cannot change are neither affected nor their positions recomputed.

Figure 1:
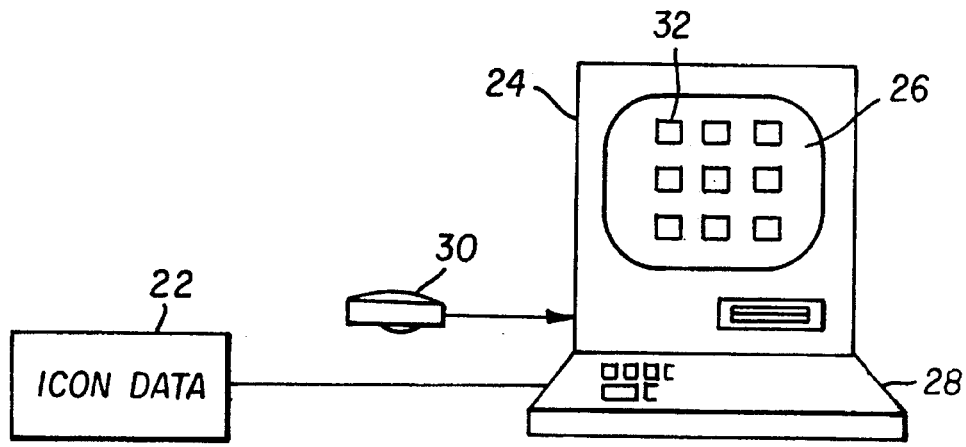
FIG. 1 illustrates a system in which the present invention is embodied.

Referring to FIG. 1, the present invention can be implemented in a system using a control and logic device, such as a computer 24, with a display device 26, an interaction device such as a keyboard 28, and a pointing device such as a computer mouse 30. On the display device 26 is shown an ordered set of icons 32 obtained from icon data 22.

The display order is, of course, predetermined. Display order is generally taken to be left-to-right (horizontal), top-to-bottom (vertical). That is, an icon to the immediate right of another immediately follows the other icon in an ordered list; and an icon below another will also follow the other icon in an ordered list (see FIGS. 2A–C). In accordance with the invention, the icon is located in an empty position at the first position in the grid based on a predetermined ordered representation. This representation must be linear and sequential in both the horizontal and vertical directions.

Figure 2A:
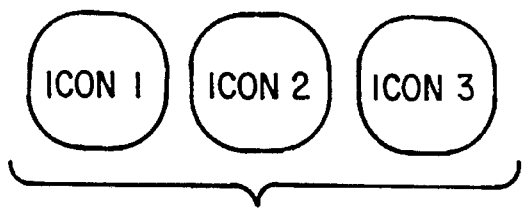
FIGS. 2A–C illustrate ordered icon layouts in accordance with the invention on a display.
Figure 2B:
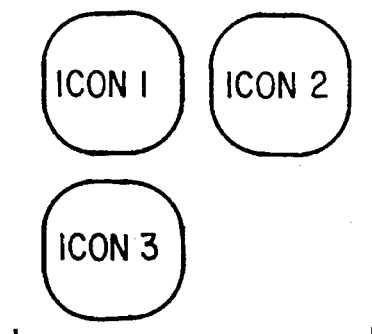
Figure 2C:
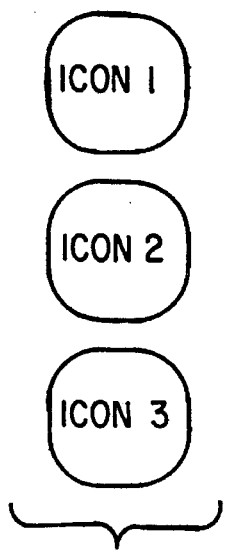

FIGS. 2A–C illustrate some examples of several icons ordered by this scheme. In FIGS. 2A–C, the icons are ordered by their number; all of the layouts are correct with respect to order. Note that any other ordering procedure (bottom to top, right-to-left) could also be chosen. The resulting layouts using an alternative procedures would be different but consistent in a similar fashion.

It is the task of the method described herein to position the icons in an ordered way, but also to optimize the use of space within the display area. To accomplish this, the blocks or steps illustrated in FIG. 3 are performed.

Figure 3:
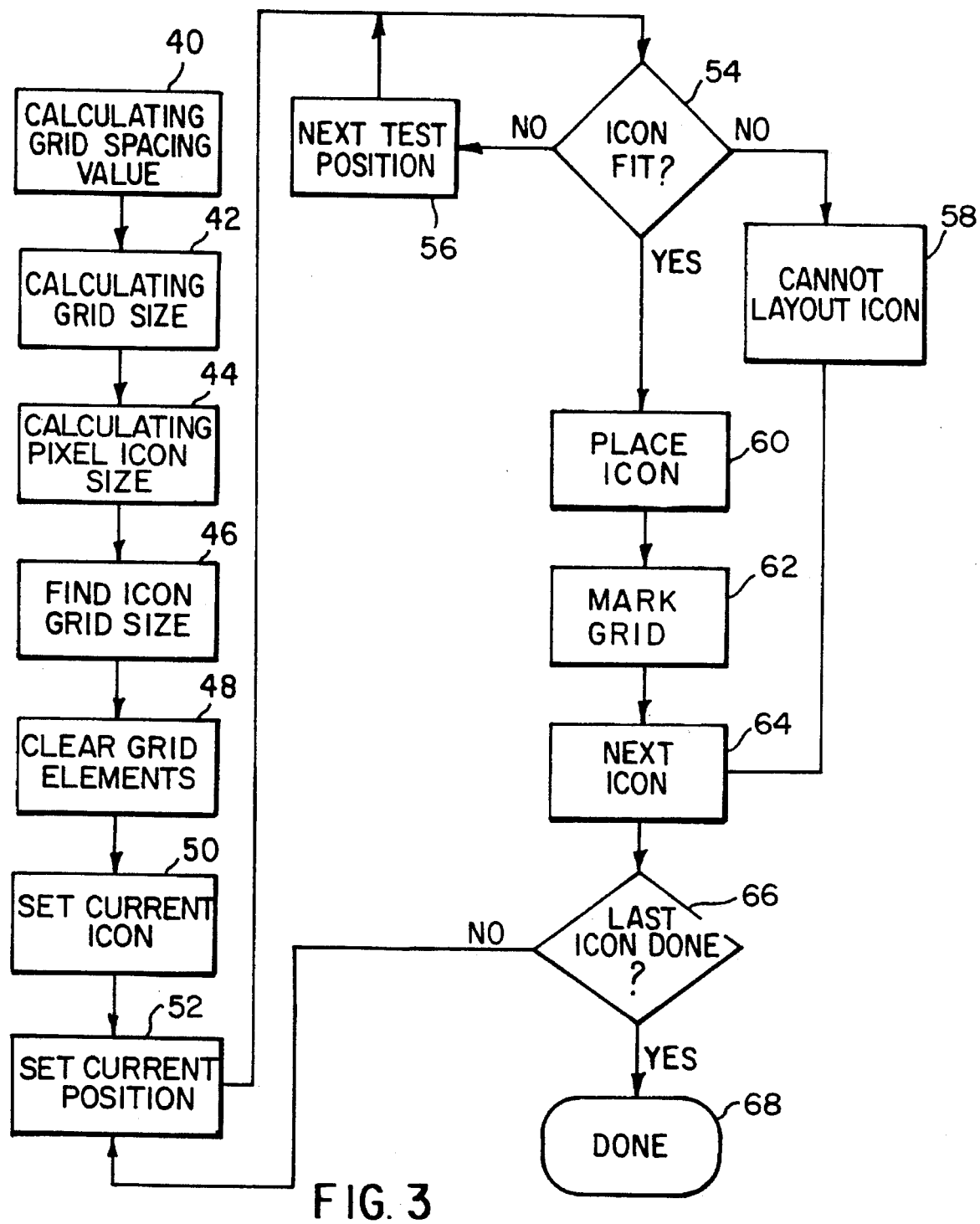
FIG. 3 illustrates a detailed flow diagram of a layout procedure in accordance with the invention.

In FIG. 3, the first step is calculating grid spacing value 40. The grid spacing value 40 is the size (in pixels) of the smallest, "common" icon displayed plus the size in pixels of any supplementary display information and gaps in pixels between icons. This value can be different in each dimension. The question of what constitutes "common" is somewhat arbitrary and can be changed.

The present invention will work no matter what "common" size is chosen. There may be several good choices, depending on icon sizes. In a preferred arrangement, if the smallest icon is clearly much smaller (by a factor of two or more) than any other icon, its size is the correct choice regardless of frequency. On the other hand, if there are at least two icons whose sizes are roughly the same (less than a factor of two), the larger of the two icon sizes should be chosen if both are commonly displayed. This choice trades off regularity and clarity of layout with efficient use of space.

After the grid spacing value in each dimension is calculated or chosen, the grid size is calculated as shown in block 42. The grid size is the largest whole number of grid elements in each dimension that are available in the display area. This value is simply the size of the display area (in pixels) divided by the grid spacing and rounded down to the nearest integer. Thus if the grid spacing is 50 pixels and the display area is 512 pixels, then the grid size is 10. The grid size may be different in each dimension. When actually displaying an icon in the display area, the pixel position of the icon in a particular dimension will be its grid location multiplied by the grid spacing in that dimension.

The grid size in each dimension is used to create a data array that records the use of space in the display area. This grid record will be used to record whether each space in the grid is occupied by an icon. Each grid array element represents a pixel block of grid spacing value size within the display area. Next, the icon size in pixels of each icon 44 is determined to be the size of the smallest rectangle that can contain each icon. An icon must be oriented within the rectangle in the same way that the icon is oriented with respect to the display. The icon sizes can be calculated at the time the program embodying this method is written, computed each time a set of icons is displayed, or chosen at run-time from a limited set of grid spacing options created by the programmer with a knowledge of what icons are likely to be displayed.

The icon grid size 46 is computed next for each icon. The grid size of an icon (in each dimension) is Icon Grid Size =

$$\frac{\text{Maximum Icon Pixel Size} + \text{Grid Spacing} - 1}{\text{Grid Spacing}}$$

where the maximum icon pixel size is the size of the enclosing rectangle described earlier.

The icon grid size 46 is simply the number of grids the icon will occupy in a dimension. The grid elements are then cleared as shown by clear grid elements 48 when beginning a fresh layout of a new set of icons. A record of the icon to be laid out (the current icon) is likewise set to the first icon in the ordered list (50).

A record of the first position in the display area (current position at grid position 0,0) is set as well (52). The current position within the display layout is always the first position following the mark grid 62 placed in accordance with the predetermined order. As new icons are placed, the current position is moved to the position immediately following the placement. Initially, the current position is the first position in the layout.

Once the initial grid and its positioning in a display and icon settings are established, the invention proceeds to compute the actual layout of the icons. This process is sequential, that is, the current icon is first set or placed, followed by the next icon in the ordered list of icons. If no order is initially assigned, an arbitrary order must be assumed. If the current icon is in the middle of the ordered list, those icons earlier in the order are not laid out again.

Note that the layout of the icon is done on a rectangular format (with lines and columns of icons) so as to provide a clean and somewhat regular ordered display area but the icons themselves do not have to be rectangular in shape so long as the maximum width and height of the icon can be either computed or measured. The icons may be curved or irregular in shape.

Once the icon size in grid blocks is found, a decision (block 54) of whether the icon can fit in the current x and y position in the grid is made. This is done by testing the grid record in the data array. If a location is unoccupied and there are enough locations contiguous to it in each dimension so that the icon will fit, the icon can be placed at that position. The grid is then marked for each location that the icon fills, and the icon is placed.

If the icon does not fit in the current position or the position is occupied, the next position 56 is identified in accordance with the predetermined order and tested as shown in block 54. The next position 56 is always the first empty grid element immediately following the latest test position according to the order specification. For the example given earlier, this will be the first unfilled grid element immediately to the right of the current position. If there is no such position, that is the current position is already at the right-most column of the grid array, the next position is then the left-most unfilled grid element one row lower. Note that the next position 56 is not necessarily below the icon (if any) which occupies that position. A somewhat clearer and less compact layout can be achieved by making the next position 56 in a row align its left side with the left side of the icon above it. If the icon does fit, it is placed 60. If the icon cannot be placed at this new test position, the following test position is tried. This process is repeated until the icon is placed or all positions following the current position have been tested. If, after all remaining positions are tested and the icon remains unplaced, it is abandoned as in block 58. The remaining icons may still be placed as described below. If the icon is abandoned, the current position remains the same and the grid placement record is unchanged. If the icon is placed, the grid is marked 62.

Once an icon is either placed or abandoned, attention moves to the next icon 64 (see block 64 in FIG. 3) in the ordered list. The current position is set to the position following the last icon placed. If the prior icon was successfully placed, the new current position is simply the next position. If the prior icon was abandoned, the new current position remains set to the first grid position following the last icon successfully placed, that is, the current position is unchanged. In an alternate arrangement, by resetting the current position to the first location in the grid after each successful placement, the layout can generally be made smaller, but at the cost of an incompletely ordered display.

This process continues until a decision (block 66) is made that no more icons remain to be placed. The process is then done (block 68).

The process described supports laying out a complete list of icons in a display area. If the order of the list is disturbed for some reason (such as moving an icon from one position to another to indicate that the icon order is changed), the process is easily adapted to re-laying out the minimum number of icons necessary to support the change.

When an ordering change is made and the display laid out again to represent the new ordering changes, the first icon in the new ordered list whose order has changed becomes the current icon. The grid positions of the current icon and all grid positions occupied by icons now following the new current icon are cleared. The current position is set to the position following the icon just prior to the new current icon. The process then proceeds from the set current position 52. Proceeding in this way will only layout the icons whose position may have changed, thus ensuring sequentiality and reducing the total computational requirements. It will also take advantage of any space unused between the new current icon and the prior one.

The use of the procedure described when applied to the layout of arbitrarily sized and shaped icons effectively creates an ordered display whose size is minimized. The computational requirements are small, and the cost of re-laying out the object icons when the list is reordered is restricted to those objects whose icons may have changed position.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

PARTS LIST 22 icon data
24 computer
26 display device
28 keyboard
30 computer pointing device
32 ordered set of icons
40 calculating grid spacing value
42 calculating grid size
44 find icon size
46 find icon grid size
48 clear grid elements
50 set current icon
52 set current position
54 next position
56 icon fit
58 cannot layout icon
60 place icon
62 mark grid
64 next icon
66 last icon done
68 done

I claim:

1. An automated method for calculating the positions of arbitrarily sized and shaped icons in a display area, comprising the steps of:

(a) calculating a rectangular grid spacing based upon a preferred common size and spacing;

(b) selecting an icon from an ordered group of icons to be displayed;

(c) determining how many grids the icon requires for a rectangle which encompasses the icon using the minimum number of grids;

(d) locating the icon in an empty position following the last placed icon on the grid based on a predetermined ordered representation, which representation is linear and sequential in both the horizontal and vertical directions;

(e) testing to determine if the icon placement is possible in the located empty position and placing the icon if correct; if not correct, testing another empty position on the grid in accordance with the predetermined order by repeating steps (d)–(e); and (f) placing the icon in correctly determined empty positions.

2. The method of claim 1 wherein the smallest common icon size is larger than the size of the smallest icon to be displayed.

3. Apparatus for calculating the positions of arbitrarily sized and shaped icons in a display area, comprising:

(a) means for calculating a rectangular grid spacing based upon a preferred common size and spacing;

(b) means for selecting an icon from an ordered group of icons to be displayed;

(c) means for determining how many grids the icon requires for a rectangle which encompasses the icon using the minimum number of grids;

(d) means for locating the icon in an empty position following the last placed icon on the grid based on a predetermined ordered representation, which representation is linear and sequential in both the horizontal and vertical directions;

(e) means for testing to determine if the icon placement is possible in the located empty position and placing the icon if correct; and (f) means for placing the icon in correctly determined empty positions in the display area.

* * * * *